LOW INSERTION FORCE CONNECTOR ASSEMBLY

Original Filed Oct. 25, 1968 2 Sheets-Sheet 1

INVENTOR
JACK W. ANHALT
BY Harvey S. Hertz
ATTORNEY

LOW INSERTION FORCE CONNECTOR ASSEMBLY

Original Filed Oct. 25, 1968 2 Sheets-Sheet 2

INVENTOR
JACK W. ANHALT

BY

Harvey S. Hertz
ATTORNEY

United States Patent Office

Re. 28,171
Reissued Sept. 24, 1974

28,171
LOW INSERTION FORCE CONNECTOR ASSEMBLY

John W. Anhalt, Orange, Calif., assignor to International Telephone and Telegraph Corporation, New York, N.Y.

Original No. 3,587,037, dated June 22, 1971, Ser. No. 770,513, Oct. 25, 1968. Application for reissue Jan. 17, 1973, Ser. No. 324,522

Int. Cl. H01r *13/54*

U.S. Cl. 339—75 M 7 Claims

Matter enclosed in heavy brackets [ ] appears in the original patent but forms no part of this reissue specification; matter printed in italics indicates the additions made by reissue.

ABSTRACT OF THE DISCLOSURE

The invention comprises a connector assembly having a plug connector and a receptacle connector. Each of the connectors contains a plurality of contacts housed in openings within the connectors. The contacting surfaces of the receptacle connector contacts extend outside of the receptacle connector opening. Upon mating of the receptacle connector and the plug connector the contact surface portions of the receptacle connector contacts enter openings containing the plug connector contacts, but do not engage the plug connector contacts. Means are provided in one of the connectors to move one of the group of contacts in tandem so that the plug connector contacting surface engages the receptacle connector contacting surface. This moving means may be of the form of a plastic insert which houses the contacts and a camshaft housed therein, rotation of the camshaft causing a portion of the plastic insert to move the contacts contained in the plastic insert so that its contacting surfaces abut the contacting surfaces of the other connector.

The invention relates in general to low insertion force connector assemblies and, more particularly, to a high density connector assembly wherein no contact mating forces are encountered during engagement of the connector assembly.

BACKGROUND OF THE INVENTION

With the advent of electronics packaging miniaturization, numerous problems have been created in the related field of electrical terminations. A prime consideration has been to physically reduce the size of connectors in response to the decreasing size of electrical systems. One difficulty presented by the conventional connectors is that although smaller connectors can be produced which afford high-density contacts in a given panel area, ensuing engagement forces rise to an intolerable level.

In United States Patent Application No. 658,258, filed Aug. 4, 1967, entitled, "High Density Zero Force Engage-Release Connector," and assigned to the assignee of the present case, there is described a system for reducing mating forces on conventional type connectors (zero force connectors). The system described in the above mentioned United States Application was designed primarily for edge-board printed circuit connectors although it has been modified for rack and panel connectors as well. The system, called a "Cam-Rac" system is relatively complex and has numerous moving parts.

In order to overcome the attendant disadvantages of prior art connector assemblies, the connector assembly of the present invention provides an extremely compact arrangement which utilizes a minimum number of parts. Further, only two components are required for actuation of the contacts. The contacts which are interchangeable may be fabricated by metal stamping, thus requiring limited manufacturing control.

SUMMARY OF THE INVENTION

More particularly, the invention comprises a connector assembly having a first connector member and a second connector member. Each of the connectors contains a plurality of contacts housed in openings within the connectors. The contacting surfaces of the second connector member contacts extend outside of the second connector opening. Upon mating of the second connector member and first connector member the contact surface portions of the second connector contacts enter openings containing the first connector member contacts, but do not engage the first connector member contacts. Means are provided in one of the connectors to move one of the group of contacts in tandem so that the first connector member contacting surface engages the second connector member contacting surface. This moving means may be of the form of a plastic insert which houses the contacts and a camshaft housed therein, rotation of the camshaft causing a portion of the plastic insert to move the contacts contained in the plastic insert so that its connector contacting surfaces abut the contacting surfaces of the other connector.

The advantage of the invention, both as to its construction and mode of operation, will be readily appreciated as the same becomes better understood by reference to the following detailed description when considered in connection with the accompanying drawings in which like referenced numerals designate like parts throughout the figures.

DESCRIPTION OF THE PREFERRED EMBODIMENT

Figure 1:
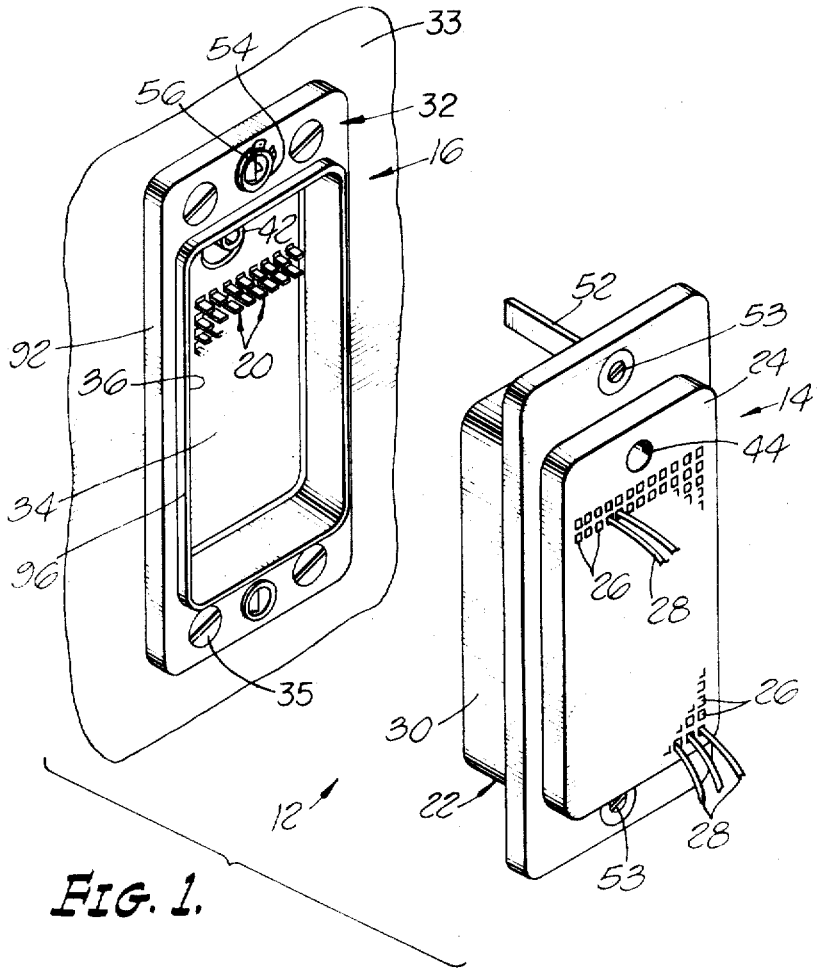
FIG. 1 is a perspective view of a preferred embodiment of the connector assembly prior to mating of the plug connector and the receptacle connector.
Figure 4:
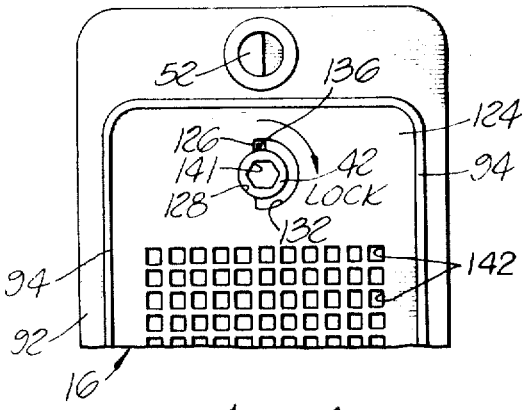
FIG. 4 is a view of the connector assembly taken along the line 4—4 of FIG. 2.
Figure 5:
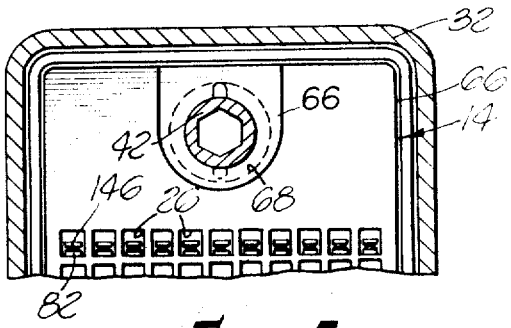
FIG. 5 is a view of the connector assembly, partly in section, taken along the line 5—5 of the FIG. 3.
Figure 2:
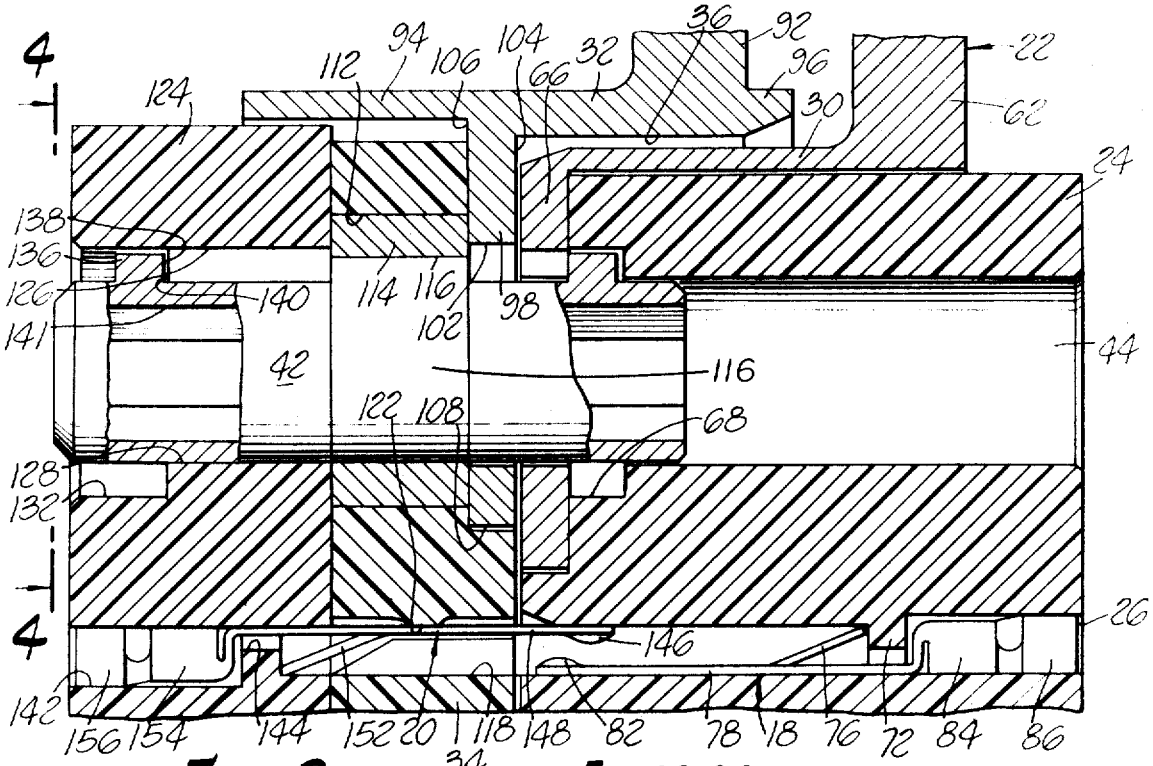
FIG. 2 depicts a side view, partly in section, of the connector assembly of FIG. 1 prior to mating of the connector contacts.
Figure 3:
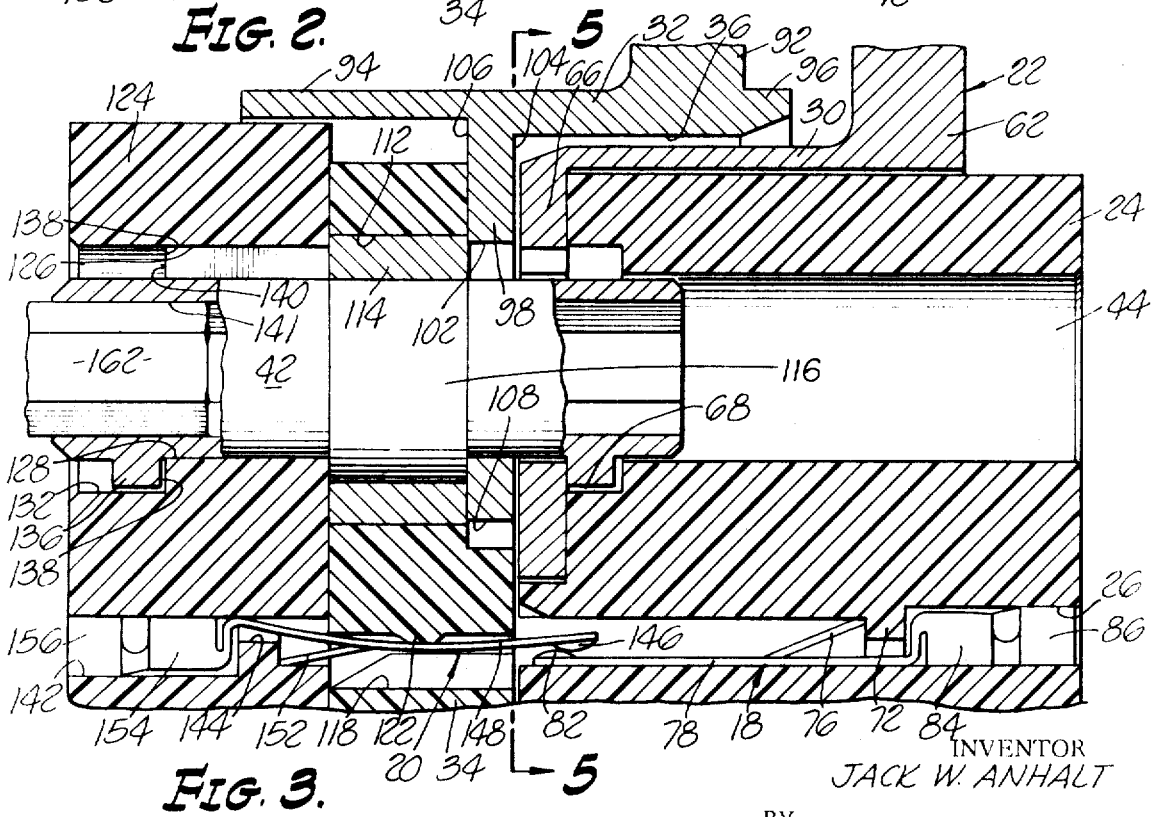
FIG. 3 is a side view, partly in section, of the connector assembly of FIG. 1 with the connector contacts mated.

Referring now to the drawings, there is shown in FIG. 1, a connector assembly 12 having a plug connector 14 and a receptacle connector 16. The plug connector has a plurality of contacts 18 (as shown in FIGS. 2 and 3) for connection with respective contacts 20 in the receptacle connector 16. The plug connector 14 comprises a metal shell 22 which is secured around a plastic insert 24. The insert 24 contains a plurality of openings 26 into which cables 28 are inserted for connection with the contacts 18. The plastic insert 24 extends to the forward end of the plug connector 14 and is surrounded by side walls 30 of the shell 22. The receptacle connector 16 comprises a shell 32 which may be mounted on a panel 33 by means of screw 35. The shell 32 is normally made of aluminum and has secured thereto, a plastic actuating plate 34 for partially mounting the contacts 20 therein. The shell 32 further comprises a forwardly extending opening 36 for mating with the side walls 30 of shell 22. A camshaft 42 mounted in the plate 34 is inserted into an opening 44 in the plug connector 14 upon mating of the plug connector with the receptacle connector. To obtain the correct polarization between the two connectors, polarized shafts 52, which are hemispherically shaped, and secured to the shell 22 by means of a screw 53, are aligned with a member 54 having a semi-circular opening 56 therein for accepting the shafts 52. Alternatively, other methods of polarization could be used such as varying the shape of opening 36 and the side walls 30 as is conventional.

Referring now to FIG. 2, there is depicted a sectional view of the plug connector 14 and receptacle connector 16, after they have been mated together, but prior to locking and contacting of the contacts. The shell 22 comprises a main flange section 62 having secured thereto and integral therewith the side walls 30 which envelope the plastic inert 24 at the front end thereof. Integral with the front end of the walls 30 is a cover lip 66. The opening 44 in the plastic section 24 also contains a semicircular keyed slot 68 into which a locking lip 70 formed on the outer surface of camshaft 42 may be inserted.

Each of the openings 26 completely extends through the width of the plastic insert 24 and contains a downwardly extending lip 72. Contacts 18 are inserted into the openings 26 in the plastic insert 24 through the rear end thereof, causing a locking tine 76 to depress and then open as it passes through the lip 72.

The contact further comprises a beam portion 78 having secured at its forward end and integral therewith, a contacting surface 82 of the somewhat semi-elliptical shape. The other end of the contacting beam is connected to a crimp pot 84 which is adjacent a rearwardly facing shoulder formed by the lip 72. The crimp pot 84 is integral with a wire strain relief 86 into which cables 28 are inserted. The receptacle shell 32 comprises a somewhat rectangular shaped outer flange member 92 which is integral with the main flange portion 94 and a forwardly extending lip 96. Further, an inwardly extending flange 98 of the receptacle shell 32 has an opening 102 therein. The flange 98 is formed of a forward facing surface 104, and a rear facing surface 106.

The plastic plate 34, used to activate the contacts 18 and 20, abuts a portion of a rearward facing shoulder 106 of the flange 98 and is adjacent an inner surface 108 of the flange 98. A circular opening 112 within the plate 34 is generally axially aligned with the opening 44 in the plastic insert 24 but slidably offset therefrom. A cylindrical actuating plate bearing 114 formed on the outer surface of the cam eccentric portion 116 of camshaft 42 is secured within the opening 112.

A plurality of openings 118 in the plate 34 are all generally axially aligned with each of the openings 26 in the plastic insert 24, for allowing the contacts 20 which are partially housed in the plate 34 to enter the insert 24 upon mating of the plug connector 14 and the receptacle connector 16. The plate 34 contains downwardly extending central lips 122 which are in direct contact with a portion of each of the contacts 20 housed in the plate 34.

The receptacle connector 16 also comprises a plastic insert 124 whose forward facing surface is flush with the rearward facing surface of the plate 34 and slidably engaged therewith. The plastic insert 124 comprises a keyway 126 and an opening 128 which is axially aligned with the opening 44 of plastic insert 24. The insert further comprises a semi-circular opening 132 at the rear end of the insert 124 which is an enlargement of the opening 128. Mounted within the opening 132 is a lip shaped member 136 formed on the outer end surface of camshaft 42 whose forward facing shoulder 138 is adjacent a rearwardly facing shoulder 140 of the plastic insert 124 which is formed at the junction of the openings 128 and 132. The camshaft 42 contains a hexagonally shaped opening 141 which is axially aligned the opening 128 of plastic insert 124, the opening 112 of plate 34, and the opening 44 of plastic insert 24.

A plurality of openings 142 in the insert 124 are axially aligned with both the openings 118 of plate 34 and the openings 26 of insert 24. An upwardly extending lip 144 in each of the openings 142 perform a similar function as the downwardly extending lip 72 of the insert 24. The contacts 20 are similar to the contacts 18 and contain a contacting surface 146 which is secured to the contact beam 148. The contact beam 148 contains locking tine 152 which is secured against the forward facing shoulder formed by the upwardly extending lip 144. The contact 20 further comprises a crimp pot 154 and a wire strain relief 156.

As can readily be seen, when a hexagonally shaped member such as the Allen wrench 162 is inserted into the hexagonally shaped opening 141 of the camshaft 42 and rotated clockwise approximately 180°, the actuating plate bearing 114 causes the actuating plate 34 to move downwardly causing the lips 122 which are continuously abutting the contact beams 148 to move downwardly, thus causing the contacting surfaces 146 to make contact with the contacting surfaces 82. Simultaneously, the locking lip 70 secures the connectors together.

While the plastic plate 34 has been depicted as being a portion of the receptacle connector it should be understood, of course, that the insert could be made a part of the plug connector as well.

Further, it should be noted that the bending of the contact beam 148 causes a high unit force between the contact surface 82 and the contact surfaces 146 resulting in a desirable slight wiping action between the surfaces should any oxide be present on the surfaces.

What is claimed is:

1. An electrical connector assembly having a first connector member containing a plurality of contacts and a second connector member containing a plurality of contacts;

each of said first member connector contacts being secured in individual openings in said first connector member and having a contacting surface, each of said second connector member contacts being secured in individual openings in said second connector member and having a contacting surface extending outside one of said second connector member openings, said second connector member contact surfaces being inserted in said first connector member contact openings when said second connector member and said first connector [members] *member* are mated, said second connector member contacts being spaced apart from said first connector member contacts in said openings during said insertion, means for moving said plurality of contacts in one of said connectors in tandem for causing said first connector contact surfaces to engage said second connector member contact surfaces, and said latter mentioned plurality of contacts being normally secured in said openings in an unstressed condition and remaining unstressed when said connector members are mated, said moving connector contacts being mounted in said second connector member, said second connector member being formed of a first fixed plate and a second plate slidably movable with respect to said first plate, *said second plate forming a part of said moving means and being positioned between said first plate and said first connector member*, concentric openings in said plates for mounting a portion of each of said moving contacts in both of said plates, [a] *each said moving contact including a base portion and an elongated beam portion between said base portion and the contacting surface of said moving contact, said base portion being fixed to said first plate, said* contact beam portion of each of said moving contacts being mounted *adjacent* [abutting] to [an extending portion of] said second plate for causing the contacting surfaces of said first connector member contacts to engage said second connector member contacts when said second plate is moved slidably with respect to said first plate, said slidable second plate engaging *only* said beam portion of said *moving contacts* [contact only when said second plate is moved slidably with respect to said first plate, said engagement occurring] at a point distant from said contact contacting [surface] *sur-*

*faces* for causing a high unit force *and wiping action* between contact surfaces of said first connector contacts and said second connector contacts.

2. An electrical connector assembly in accordance with claim 1 wherein said means for moving said contacts [comprises an actuating plate having a portion thereof in direct contact with each of the plurality of moving contact, and] *includes* a [keyed] *rotatable* member having an eccentric portion fastened to said [actuating] *second* plate, rotation of said [keyed] *rotatable* member causing said plate to move said contacts.

3. An electrical connector assembly in accordance with claim 1 wherein said first connector member contacts and said second connector member contacts are similar in construction.

4. An electrical connector assembly in accordance with claim 1 wherein said means for moving said plurality of contacts simultaneously locks said first connector member, and said second connector member together.

5. An electrical connector assembly [in accordance with claim 1 wherein wiping action occurs between the contact surfaces upon engagement of said surfaces.] *having a first connector member containing a plurality of contacts and a second connector member containing a plurality of contacts;*

*each of said first member connector contacts being secured in individual openings in said first connector member and having a contacting surface;*

*each of said second connector member contacts being secured in individual openings in said second connector member and having a contacting surface extending outside one of said second connector member openings;*

*the contacting surfaces of said second connector member contacts being inserted in said first connector member contact openings when said connector members are mated;*

*said second connector member contacts being spaced apart from said first connector member contacts in said openings during said insertion;*

*means including a movable insulator on one of said connector members for moving said plurality of contacts in said one of said connector members in tandem for causing said contacting surfaces of said first and second connector member contacts to engage each other, said one connector member also including a fixed insulator, said movable insulator being slidably movable with respect to said fixed insulator and positioned between said fixed insulator and the other of said connector members;*

*said contacts being normally secured in said openings in an unstressed condition and remaining unstressed when said connector members are mated;*

*each said contact of said one connector member including a base portion and an elongated beam portion between said base portion and the contacting surface of said contact, said base portion being fixed to said fixed insulator;*

*said contact beam portion of each of said one connector member contacts being mounted adjacent to a portion of said movable insulator for causing the contacting surfaces of said first connector member contacts to engage the contacting surfaces of said second connector member contacts when said movable insulator is shifted with respect to said fixed insulator in a predetermined direction; and*

*said movable insulator engaging only said beam portion at a point distant from said contact contacting surfaces for causing a high unit force and wiping action between said contacting surfaces of said first connector contacts and said second connector contacts.*

*6. An electrical connector assembly comprising:*

*a first connector member having a pluarlity of contacts, each contact having a contacting surface and being secured in individual openings in said first connector member;*

*a second connector member having a plurality of contacts, each of said second connector member contacts being secured in individual openings in said second connector member and having a contacting surface extending from said openings;*

*each of said contacts in said second connector member being associated with a contact in said first connector member and being spaced apart from said associated contact when said connector members are mated;*

*means for moving said plurality of contacts in one of said connector members in tandem causing said first connector member contacting surfaces to engage with said second connector member contacting surfaces after said first connector member is secured to said second connector member;*

*each said contact of said one connector member having an elongated beam portion between its respective contacting surface and its securement to said one connector member; and*

*said moving means including a slidable plate positioned to engage only said beam portion at a point distant from said one connector member contact contacting surface for causing a high unit force and wiping action between the associated contacting surfaces of said first connector member contacts and second connector member contacts.*

*7. An electrical connector assembly in accordance with claim 6, including means providing a rigid support for the contacting surfaces of the contacts of the other connector member said other connector member contacts being disposed between said rigid support means and said one connector member contacts.*

References Cited

The following references, cited by the Examiner, are of record in the patented file of this patent or the original patent.

UNITED STATES PATENTS

| | | | |
|---|---|---|---|
| 2,289,172 | 7/1942 | Beal | 339—75 M |
| 2,407,176 | 9/1946 | Piatt et al. | 339—18 B |
| 3,209,302 | 9/1965 | Uberbacker | 339—45 M |
| 3,315,212 | 4/1967 | Peterson | 339—75 M |

FOREIGN PATENTS

| | | | |
|---|---|---|---|
| 625,388 | 6/1949 | Great Britain | 339—75 M |

JOSEPH H. McGLYNN, Primary Examiner